United States Patent
Okamura et al.

(10) Patent No.: US 10,145,455 B2
(45) Date of Patent: Dec. 4, 2018

(54) FRICTION-TYPE CONTINUOUSLY VARIABLE TRANSMISSION

(71) Applicant: Nidec Shimpo Corporation, Nagaokakyo-shi, Kyoto (JP)

(72) Inventors: Kikuo Okamura, Nagaokakyo (JP); Hitoshi Inoue, Nagakakyo (JP); Norio Deguchi, Nagakakyo (JP)

(73) Assignee: NIDEC SHIMPO CORPORATION, Kyoto (JP)

( * ) Notice: Subject to any disclaimer, the term of this patent is extended or adjusted under 35 U.S.C. 154(b) by 0 days.

(21) Appl. No.: 15/515,284

(22) PCT Filed: Aug. 31, 2015

(86) PCT No.: PCT/JP2015/074647
§ 371 (c)(1),
(2) Date: Mar. 29, 2017

(87) PCT Pub. No.: WO2016/052044
PCT Pub. Date: Apr. 7, 2016

(65) Prior Publication Data
US 2017/0219069 A1 Aug. 3, 2017

(30) Foreign Application Priority Data
Sep. 30, 2014 (JP) ................................. 2014-200991

(51) Int. Cl.
*F16H 13/08* (2006.01)
*F16H 15/52* (2006.01)
(Continued)

(52) U.S. Cl.
CPC ............. *F16H 15/52* (2013.01); *F16H 13/08* (2013.01); *F16H 15/04* (2013.01); *F16H 15/506* (2013.01)

(58) Field of Classification Search
None
See application file for complete search history.

(56) References Cited

U.S. PATENT DOCUMENTS 2,209,497 A * 7/1940 Winger .................. F16H 15/52
475/185
2,359,540 A * 10/1944 Bade ...................... F16H 15/50
475/185
(Continued)

FOREIGN PATENT DOCUMENTS

GB 592320 A * 9/1947 ............. F16H 15/52
JP 37-28132 Y1 10/1962
(Continued)

OTHER PUBLICATIONS

Okamura et al., "Continuously Variable Transmission and Bicycle", U.S. Appl. No. 15/666,597, filed Aug. 2, 2017.
(Continued)

*Primary Examiner* — Justin Holmes
(74) *Attorney, Agent, or Firm* — Keating & Bennett, LLP

(57) ABSTRACT

A friction-type continuously variable transmission includes first to third rolling elements of which are annular and is centered on a principal axis, planetary rollers arranged in a circumferential direction about the principal axis, support pins arranged to rotatably support the planetary rollers, and a planetary roller support portion arranged to support each support pin such that the support pin is capable of inclining in a section including the principal axis. Each planetary roller includes a recessed portion in the shape of a circular ring in an outer circumference thereof centered on the support pin. The first rolling element is arranged to make contact with a rolling contact surface of the planetary roller from one side in a radial direction axially below the recessed portion. The first rolling element is arranged to make contact with the rolling contact surface of the planetary roller from
(Continued)

the one side in the radial direction axially above the recessed portion. The third rolling element is arranged to make contact with the recessed portion of the planetary roller from an opposite side in the radial direction, and is supported to be capable of moving in a vertical direction relative to the planetary roller support portion.

21 Claims, 10 Drawing Sheets

(51) Int. Cl.
*F16H 15/04* (2006.01)
*F16H 15/50* (2006.01)

(56) References Cited

U.S. PATENT DOCUMENTS

| | | | |
|---|---|---|---|
| 2,469,653 A | | 5/1949 | Kopp |
| 2,826,938 A | * | 3/1958 | Chillson ............... F16H 15/52 |
| | | | 475/190 |
| 2,860,530 A | * | 11/1958 | Hine ..................... F16H 15/52 |
| | | | 475/190 |
| 3,407,687 A | * | 10/1968 | Hayashi ................ F16H 15/52 |
| | | | 475/189 |
| RE41,892 E | * | 10/2010 | Miller .................... B62K 3/002 |
| | | | 476/36 |
| 2006/0084549 A1 | | 4/2006 | Smithson et al. |
| 2018/0195586 A1 | * | 7/2018 | Thomassy ............. F16H 15/28 |
| 2018/0209518 A1 | * | 7/2018 | Seki ...................... F16H 15/28 |
| 2018/0223970 A1 | * | 8/2018 | Cheng ................... F16H 15/28 |

FOREIGN PATENT DOCUMENTS

| | | |
|---|---|---|
| JP | 59-069565 A | 4/1984 |
| JP | 2003-021212 A | 1/2003 |
| JP | 2009-041582 A | 2/2009 |
| JP | 2011-231929 A | 11/2011 |
| JP | 2012-122567 A | 6/2012 |

OTHER PUBLICATIONS

Official Communication issued in International Patent Application No. PCT/JP2015/074647, dated Nov. 24, 2015.

* cited by examiner

FRICTION-TYPE CONTINUOUSLY VARIABLE TRANSMISSION

BACKGROUND OF THE INVENTION

1. Field of the Invention

The present invention relates to a friction-type continuously variable transmission.

2. Description of the Related Art

Continuously variable transmissions including a plurality of planetary rollers have been known (for example, JP-A 2011-231929). In a continuously variable transmission described in JP-A 2011-231929, a plurality of balls are distributed on a plane perpendicular to a shaft. Each ball makes contact with an input disk on one side, and makes contact with an output disk on an opposite side, and a torque is transferred from the input disk to the output disk (134) through the balls.

Each ball includes a ball shaft capable of inclination, and the speed ratio between the input disk and the output disk can be adjusted by varying the inclination angle of the ball shaft with respect to the shaft. The balls are supported by a pair of arms such that each ball is capable of inclination. The pair of arms, which support both ends of the ball shaft, are both attached to a speed change roller. Accordingly, the speed ratio between the input disk and the output disk is varied when the speed change roller is displaced along the shaft, varying the inclination angle of the ball shaft with respect to the shaft.

Such a known continuously variable transmission as described above has a complicated transmission mechanism, and therefore has problems in a large number of parts and an increased weight, and additionally in difficulty in reducing a production cost.

SUMMARY OF THE INVENTION

In view of the above-described circumstances, the present invention has been conceived to achieve improved transmission performance and a reduced number of parts of a friction-type continuously variable transmission.

A friction-type continuously variable transmission according to one preferred embodiment of the present invention includes a first rolling element being annular and centered on a principal axis extending in a vertical direction; a second rolling element being annular and centered on the principal axis; a third rolling element being annular and centered on the principal axis; a plurality of planetary rollers; a plurality of support pins; and a planetary roller support portion. The planetary rollers are arranged in a circumferential direction about the principal axis. The support pins are each arranged to rotatably support a separate one of the planetary rollers. The planetary roller support portion is arranged to support each support pin such that the support pin is capable of inclining in a section including the principal axis. Each planetary roller includes a recessed portion or projecting portion in a shape of a circular ring in an outer circumference thereof centered on the support pin. The first rolling element is arranged to make contact with a rolling contact surface of the planetary roller from one side in a radial direction axially below the recessed portion or the projecting portion, and is supported through a bearing to be rotatable relative to the third rolling element. The second rolling element is arranged to make contact with the rolling contact surface of the planetary roller from the one side in the radial direction axially above the recessed portion or the projecting portion, and is supported through a bearing to be rotatable relative to the third rolling element. The third rolling element is arranged to make contact with the recessed portion or the projecting portion of the planetary roller from an opposite side in the radial direction, and is supported to be capable of moving in the vertical direction relative to the planetary roller support portion.

According to one preferred embodiment of the present invention, a friction-type continuously variable transmission is able to achieve a reduced number of parts, and is capable of continuously varying the speed ratio without adopting a complicated mechanism.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. For the sake of convenience in description, a direction parallel to a principal axis J of a continuously variable transmission is herein referred to as a vertical direction. However, this definition of the vertical direction should not be construed to restrict in any way the orientation of a continuously variable transmission according to any preferred embodiment of the present invention when in use. In addition, the direction parallel to the principal axis J is referred to simply by the term "axial direction", "axial", or "axially", radial directions centered on the principal axis J are each referred to simply by the term "radial direction", "radial", or "radially", and a circumferential direction about the principal axis J is referred to simply by the term "circumferential direction", "circumferential", or "circumferentially".

Figure 1:
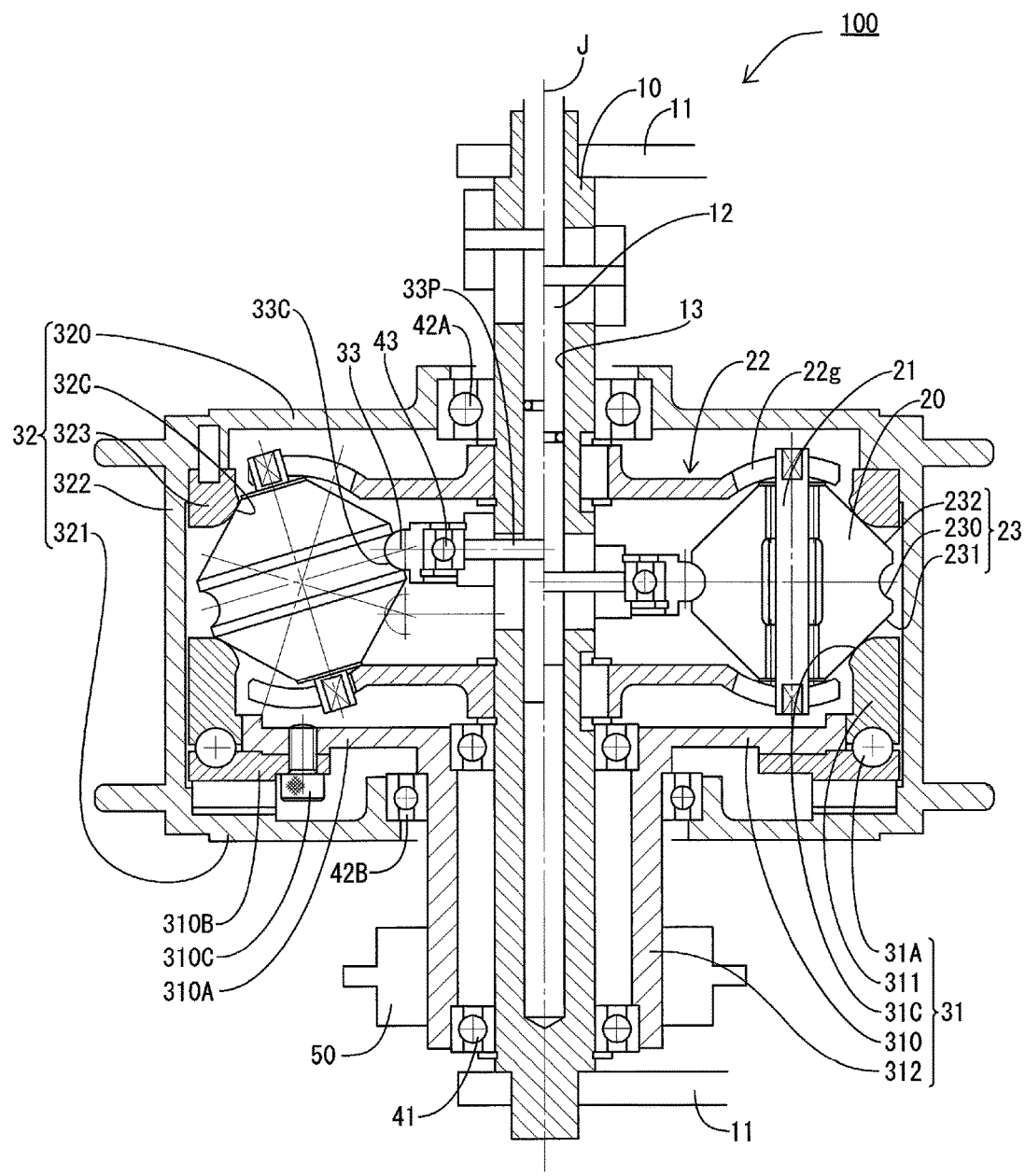
FIG. 1 is a diagram illustrating an exemplary structure of a continuously variable transmission according to a first preferred embodiment of the present invention.

FIG. 1 is a diagram illustrating an exemplary structure of a continuously variable transmission 100 according to a first preferred embodiment of the present invention, illustrating a section thereof taken along a plane including the principal axis J. Note that, in FIG. 1, for the sake of convenience in description, left and right sides of the principal axis J illustrate sections thereof in different operating states.

The continuously variable transmission 100 is a friction-type continuously variable transmission for use in a bicycle. The continuously variable transmission 100 is, for example, installed in a wheel of the bicycle as a hub having a speed change function. Continuously variable transmissions according to other preferred embodiments of the present invention may not be used in bicycles. Continuously variable transmissions according to other preferred embodiments of the present invention may not be installed in wheels as hubs.

The continuously variable transmission 100 includes a shaft 10, an adjusting rod 12, planetary rollers 20, a first rolling element 31, a second rolling element 32, and a third rolling element 33. Each of these components will be described in detail below.

The shaft 10 is a substantially columnar member arranged to extend in an axial direction (i.e., the vertical direction). The shaft 10 has a central axis coinciding with the principal axis J. Both ends of the shaft 10 are supported by a pair of dropouts 11. Each dropout 11 is a hub attachment portion provided in a bicycle frame. A hollow portion 13 defined by an inside surface extending in the axial direction is arranged in the shaft 10. The adjusting rod 12, for example, is accommodated in the hollow portion 13. The hollow portion 13 is, for example, a space defined by a cylindrical inside surface extending in the axial direction in the shaft 10. In this case, at least a portion of the shaft 10 extending in the axial direction is cylindrical.

The adjusting rod 12 is a member arranged to extend in the axial direction. The adjusting rod 12, for example, has a substantially columnar shape, and is arranged in the hollow portion 13. The third rolling element 33 is supported by the adjusting rod 12 through a pin 33P, and is arranged to move in the axial direction together with the adjusting rod 12. Thus, the adjusting rod 12 is incapable of rotating but capable of moving in the axial direction relative to the shaft 10.

The continuously variable transmission 100 includes the plurality of planetary rollers 20. The planetary rollers 20 are rolling elements arranged in the circumferential direction about the principal axis J. The planetary rollers 20 are arranged at regular intervals in the circumferential direction on a plane perpendicular to the principal axis J. Each planetary roller 20 is arranged to have a double-cone shape, being made up of two truncated cones having the same size and shape with bottom surfaces thereof being joined to each other. Each planetary roller 20 has a joint portion at which the bottom surfaces of the two truncated cones are joined to each other. At least one recessed portion 230 is defined in an outer circumference of the joint portion. The recessed portion 230 is substantially in the shape of a circular ring, and is arranged to extend in a circumferential direction about a support pin 21 along an outer circumferential surface of the planetary roller 20.

The support pin 21 is arranged to rotatably support the planetary roller 20. The support pin 21 is supported by a planetary roller support portion 22 to be capable of inclining on a plane including the principal axis J.

The planetary roller support portion 22 is arranged to support the support pin 21 such that the support pin 21 is capable of inclining. The planetary roller support portion 22 is fixed to the shaft 10. The planetary roller support portion 22 includes a pair of guide portions 22g each of which is arranged to support a separate one of both ends of the support pin 21. The pair of guide portions 22g are, for example, arranged to have concentric arc shapes on a plane including the principal axis J. Both the ends of the support pin 21 are supported to be capable of moving along these guide portions 22g.

A rolling contact surface 23 is the outer circumferential surface of the planetary roller 20. The rolling contact surface 23 includes the recessed portion 230 in the shape of a circular ring, a first conical surface 231, and a second conical surface 232. The first conical surface 231 is arranged axially below the recessed portion 230. The second conical surface 232 is arranged axially above the recessed portion 230.

A surface defining the recessed portion 230 is a rolling contact surface with which the third rolling element 33 makes contact. The recessed portion 230 is, in a section, a portion of the outer circumferential surface of the planetary roller 20 which is recessed toward the support pin 21. The shape of the section thereof preferably includes an arc. The recessed portion 230 is arranged in a substantial middle with respect to a longitudinal direction of the support pin 21. The contour of the recessed portion 230 is in the shape of a circular ring and is centered on the support pin 21. That is, the recessed portion 230 is a groove portion in the shape of a circular ring and being coaxial with the support pin 21.

The first conical surface 231 is a rolling contact surface with which the first rolling element 31 makes contact. The first conical surface 231 is a conical surface coaxial with the support pin 21, and is arranged below the recessed portion 230. The first conical surface 231 is arranged to taper with increasing distance from the recessed portion 230. In other words, the outside diameter of the first conical surface 231 gradually decreases with increasing axial distance from the recessed portion 230. The first conical surface 231 is arranged adjacent to the recessed portion 230. An upper end of the first conical surface 231 coincides with a lower end of the recessed portion 230.

The second conical surface 232 is a rolling contact surface with which the second rolling element 32 makes contact. The second conical surface 232 is a conical surface coaxial with the support pin 21, and is arranged above the recessed portion 230. The second conical surface 232 is arranged to taper with increasing distance from the recessed portion 230. In other words, the outside diameter of the second conical surface 232 gradually decreases with increasing axial distance from the recessed portion 230. The second conical surface 232 is arranged adjacent to the recessed portion 230. A lower end of the second conical surface 232 coincides with an upper end of the recessed portion 230.

The first rolling element 31 is supported to be rotatable relative to the shaft 10. The first rolling element 31 is arranged to make contact with each planetary roller 20 from radially outside with respect to the principal axis J. The first rolling element 31 is arranged to have an annular shape centered on the principal axis J. More specifically, the first rolling element 31 includes a first rolling element support portion 310, a first rolling element annular portion 311, and a first rolling element cylindrical portion 312.

The first rolling element support portion 310 is substantially in the shape of a disk, extending radially. The first rolling element support portion 310 includes a decreased diameter support portion 310A, a circular ring portion 310B, and a bolt 310C. The circular ring portion 310B is arranged to have an outside diameter greater than an outside diameter of the decreased diameter support portion 310A. The circular ring portion 310B is fixed to the decreased diameter support portion 310A through, for example, the bolt 310C or the like.

The first rolling element annular portion 311 is arranged to have an annular shape, and is arranged to extend axially upward from a radially outer end of the first rolling element support portion 310. A lower end of the first rolling element annular portion 311 is supported by the circular ring portion 310B through a pressure control cam 31A. The first rolling element annular portion 311 includes a contact portion 31C arranged to make contact with each planetary roller 20 in an inner circumferential surface thereof in the vicinity of an upper end of the first rolling element annular portion 311. The contact portion 31C is arranged to make contact with the first conical surface 231 from radially outside with respect to the principal axis J. The pressure control cam 31A is arranged to generate an axial urging force using a rotary torque about the principal axis J. The first rolling element annular portion 311 is thus pressed against the rolling contact surface 23. An appropriate contact pressure is generated between the first rolling element annular portion 311 and the rolling contact surface 23.

The first rolling element cylindrical portion 312 is arranged to have a cylindrical shape, and is arranged to extend axially downward from a radially inner end of the first rolling element support portion 310. The first rolling element cylindrical portion 312 is supported by the shaft 10 through a bearing 41. A sprocket 50 is fixed to an outer circumferential surface of the first rolling element cylindrical portion 312. The sprocket 50 is, for example, a chain wheel (not shown) coupled to a power transmission chain (not shown).

The second rolling element 32 is a housing of the continuously variable transmission 100, and is arranged to house the planetary rollers 20, the first rolling element 31, and the third rolling element 33. The second rolling element 32 is supported to be rotatable relative to the shaft 10 and the first rolling element 31, and is arranged to make contact with each planetary roller 20 from radially outside with respect to the principal axis J.

The second rolling element 32 is arranged to have an annular shape centered on the principal axis J. More specifically, the second rolling element 32 includes a second rolling element upper support portion 320, a second rolling element lower support portion 321, a second rolling element cylindrical portion 322, and a second rolling element annular portion 323.

The second rolling element upper support portion 320 is substantially in the shape of a disk, extending radially, and is arranged axially above the planetary rollers 20. The second rolling element upper support portion 320 is supported by the shaft 10 through a bearing 42A.

The second rolling element lower support portion 321 is substantially in the shape of a disk, extending radially, and is arranged axially below the planetary rollers 20. The second rolling element lower support portion 321 is arranged axially below the first rolling element support portion 310, and is supported by the first rolling element cylindrical portion 312 through a bearing 42B.

The second rolling element cylindrical portion 322 is arranged to have a cylindrical shape, and is arranged to join a radially outer end of the second rolling element upper support portion 320 and a radially outer end of the second rolling element lower support portion 321 to each other. The second rolling element cylindrical portion 322 corresponds to an outer circumferential surface of a wheel hub.

The second rolling element annular portion 323 is in the shape of a circular ring, and is fixed to an inner circumferential surface of the second rolling element cylindrical portion 322. The second rolling element annular portion 323 includes a contact portion 32C arranged to make contact with each planetary roller 20 in an inner circumferential surface thereof in the vicinity of a lower end thereof. The contact portion 32C is arranged to make contact with the second conical surface 232 of each planetary roller 20 from radially outside with respect to the principal axis J.

The third rolling element 33 is arranged to have an annular shape centered on the principal axis J, and is supported by the adjusting rod 12 through a bearing 43. That is, the third rolling element 33 is supported to be capable of moving in the axial direction relative to the shaft 10, and is supported to be rotatable relative to the shaft 10.

The third rolling element 33 includes a contact portion 33C arranged to make contact with each planetary roller 20. The contact portion 33C is arranged to make contact with an inner surface of the recessed portion 230 of each planetary roller 20 from radially inside with respect to the principal axis J. The contact portion 33C is arranged to have an arc shape being convex radially outwardly in a section including the principal axis J.

Next, an operation of the continuously variable transmission 100 will now be described below. In the continuously variable transmission 100, the first rolling element 31 is used as an input side, and the second rolling element 32 is used as an output side. The first rolling element receives a rotary torque from the power transmission chain (not shown) through the sprocket 50. The rotary torque is transferred to the second rolling element 32 through the planetary rollers 20.

The ratio between the rotation rate of the first rolling element 31 and the rotation rate of the second rolling element 32 varies with the inclination angle of the support pin 21 with respect to the shaft 10. Accordingly, the speed change ratio of the continuously variable transmission 100 can be varied by an axial movement of the adjusting rod 12 and a resulting change in the inclination of the support pin 21.

The adjusting rod 12 is capable of moving in the axial direction relative to the shaft 10. The third rolling element 33 is capable of moving in the axial direction together with the adjusting rod 12. Meanwhile, the planetary roller support portion 22 is fixed to the shaft 10. Accordingly, the axial movement of the adjusting rod 12 causes the third rolling element 33 to move in the axial direction relative to the planetary roller support portion 22.

Here, the support pin 21 is supported by the planetary roller support portion 22 to be capable of inclining. The contact portion 33C of the third rolling element 33 is arranged to make contact with the inner surface of the recessed portion 230 of each planetary roller. Therefore, an axial movement of the third rolling element 33 relative to the planetary roller support portion 22 causes the support pin 21 to incline to vary the speed change ratio of the continuously variable transmission 100.

Figure 2:
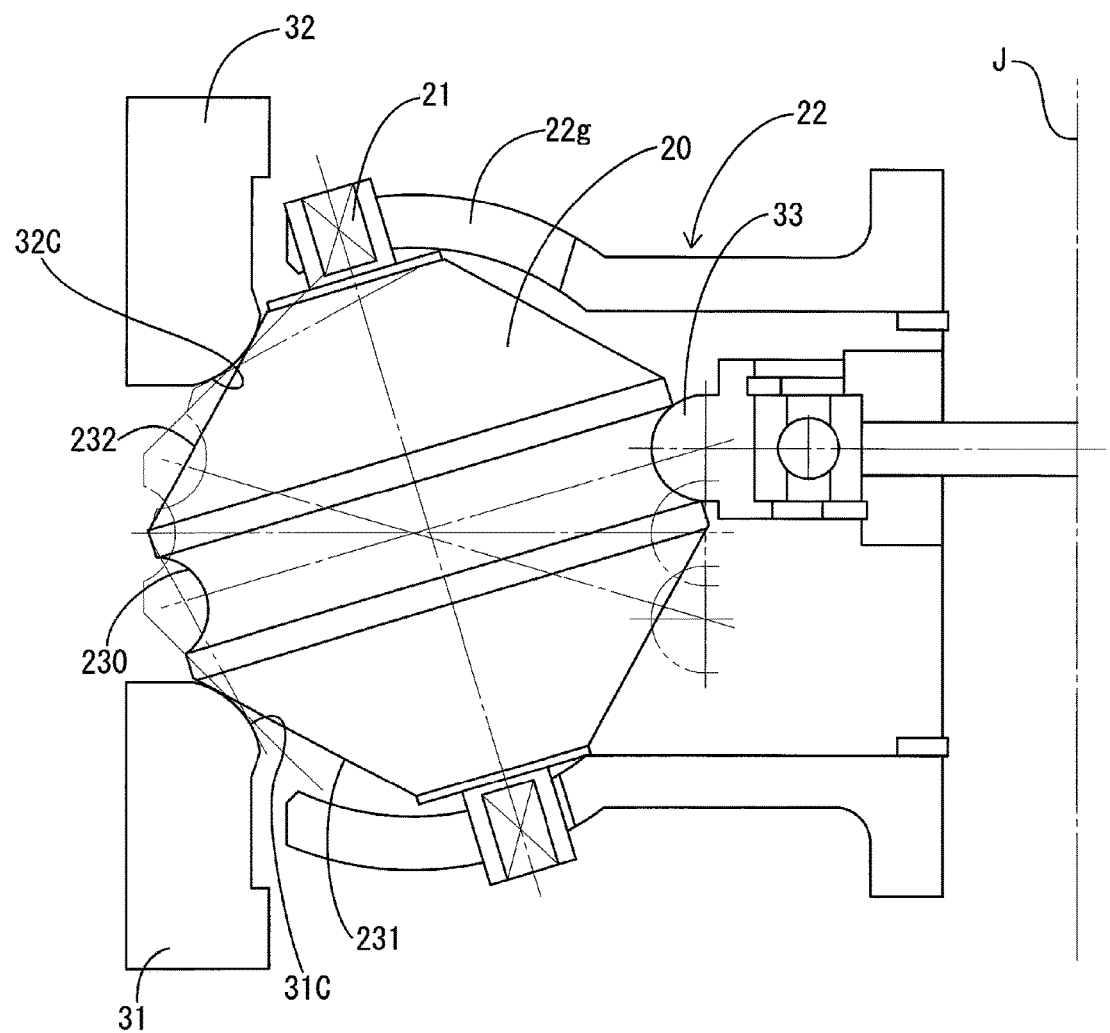
FIG. 2 is a diagram for explaining the shapes of contact portions of a first rolling element and a second rolling element.
Figure 3:
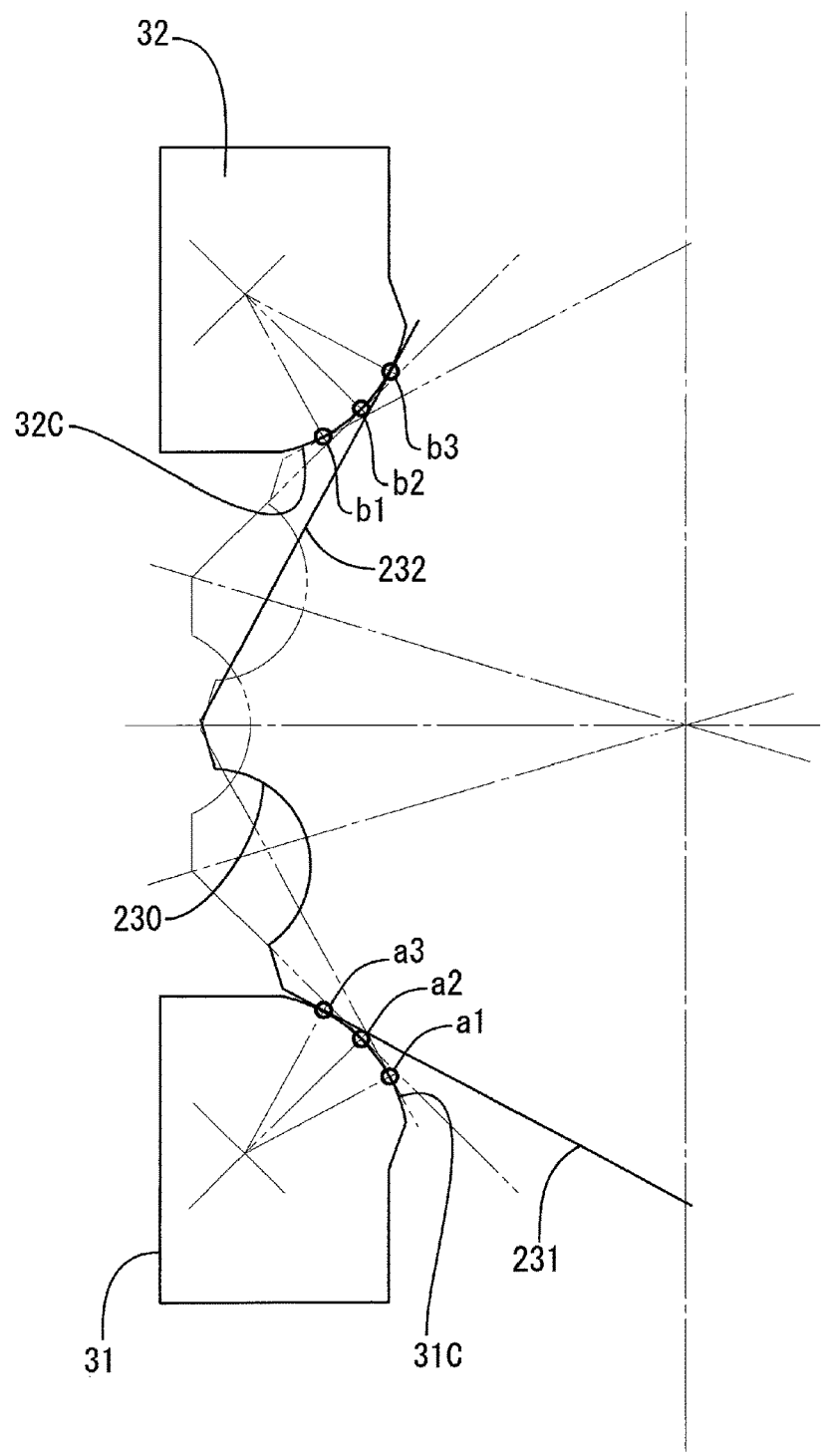
FIG. 3 is an enlarged view representing a portion of FIG. 2 in an enlarged form.

FIGS. 2 and 3 are diagrams for explaining the shapes of the contact portions 31C and 32C of the first rolling element and the second rolling element 32, respectively. FIG. 2 depicts three planetary rollers 20 with different inclination angles of the support pin 21 with respect to the principal axis J superimposed upon one another. FIG. 3 is an enlarged view representing a portion of FIG. 2 in an enlarged form.

Points a1-a3 in the figure are example points of contact between the first rolling element 31 and the planetary roller 20, and the contact point a1-a3 moves on the contact portion 31C of the first rolling element 31 in accordance with the inclination angle of the support pin 21. Points b1-b3 in the figure are example points of contact between the second rolling element 32 and the planetary roller 20. The contact point b1-b3 moves on the contact portion 32C of the second rolling element 32 in accordance with the inclination angle of the support pin 21.

The rolling contact surface 23 of the planetary roller is not a spherical surface, but includes the first conical surface 231 and the second conical surface 232. Therefore, a change in the inclination angle of the support pin 21 with respect to the principal axis J results in a change in the inclination angle of the rolling contact surface 23 with respect to the principal axis J. Meanwhile, each of the shapes of the contact portions 31C and 32C of the first and second rolling elements 31 and 32, respectively, which make contact with the rolling contact surface 23, accords with an envelope of the rolling contact surface 23 when the inclination angle of the support pin 21 is varied.

The position and orientation of each of the first rolling element 31 and the second rolling element 32 are fixed regardless of the inclination angle of the support pin 21. Therefore, since each of the shapes of the contact portions 31C and 32C accords with the aforementioned envelope, points of contact between the first and second rolling elements 31 and 32 and the rolling contact surface 23 are allowed to move on the contact portions 31C and 32C, respectively, in accordance with the inclination angle of the support pin 21. As a result, a good contact of each of the first rolling element 31 and the second rolling element 32 with the planetary roller 20 can be maintained regardless of the inclination angle of the support pin 21. Thus, an appropriate contact pressure is generated between the planetary roller 20 and each of the first rolling element 31 and the second rolling element 32.

The shape of the contact portion 31C will now be described more specifically below. The inclination angle of the first conical surface 231 with respect to the principal axis J varies with the inclination angle of the support pin 21. The shape of a section of the contact portion 31C taken along a plane including the principal axis J accords with an envelope of a generatrix of the first conical surface 231 when the inclination angle of the support pin 21 is varied. This feature allows the contact point a1-a3 between the first rolling element and the planetary roller 20 to move on the contact portion 31C in accordance with the inclination angle of the support pin 21. Therefore, a good contact of the first rolling element 31 with the first conical surface 231 can be maintained regardless of the inclination angle of the support pin 21. Note that the generatrix of the first conical surface 231 is a generatrix including a point of contact with the first rolling element 31, and is a line of intersection of the first conical surface 231 and a plane including the support pin 21.

The shape of the contact portion 32C of the second rolling element 32 will now be described more specifically below. The inclination angle of the second conical surface 232 with respect to the principal axis J varies with the inclination angle of the support pin 21. The contour of the contact portion 32C in a section including the principal axis J accords with an envelope of a generatrix of the second conical surface 232 when the inclination angle of the support pin 21 is varied. This feature allows the contact point b1-b3 between the second rolling element 32 and the planetary roller 20 to move on the contact portion 32C in accordance with the inclination angle of the support pin 21. Therefore, a good contact of the second rolling element 32 with the second conical surface 232 can be maintained regardless of the inclination angle of the support pin 21. Note that the generatrix of the second conical surface 232 is a generatrix including a point of contact with the second rolling element 32, and is a line of intersection of the second conical surface 232 and a plane including the support pin 21.

Figure 4:
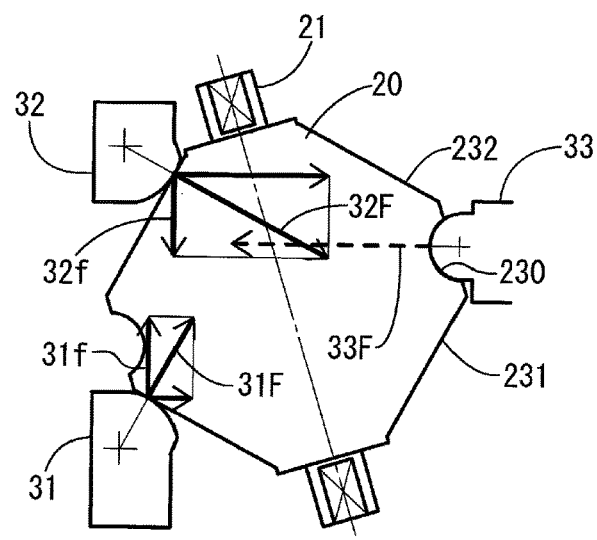
FIGS. 4A-4C is a diagram for explaining the speed change ratio and a rotary torque.
Figure 4:
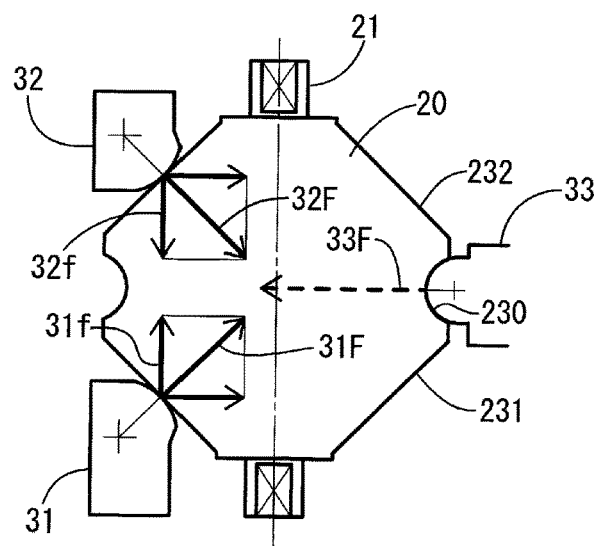
Figure 4:
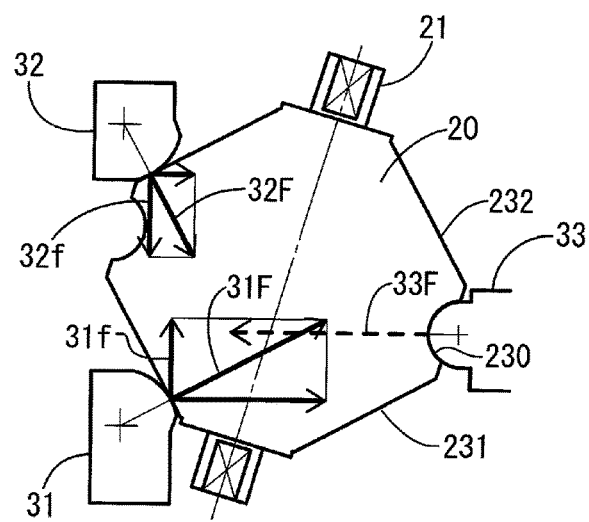

FIGS. 4A-4C are diagrams for explaining the speed change ratio and the rotary torque. FIGS. 4A-4C illustrate states at times of low-speed rotation, medium-speed rotation, and high-speed rotation, respectively. First, with reference to FIGS. 4A-4C the relationship between the inclination angle of the support pin 21 and the speed change ratio will be described. Next, with reference to FIGS. 4A-4C the relationship between the inclination angle of the support pin 21 and the rotary torque will be described.

In FIG. 4b, the support pin 21 is arranged in parallel with the principal axis J. Accordingly, the first rolling element 31 and the second rolling element 32 make contact with portions of an outer circumference of the planetary roller 20 which are substantially the same in the radius of rotation. As a result, the rotation rate of the first rolling element 31 is substantially equal to the rotation rate of the second rolling element 32, so that the second rolling element 32 rotates at a medium speed.

In FIG. 4a, the support pin 21 is inclined with respect to the principal axis J. An upper end of the support pin is arranged radially outward of a lower end of the support pin 21. This causes the second rolling element 32 to make contact with a portion of the outer circumference of the planetary roller 20 which is smaller in the radius of rotation than in the case of FIG. 4b. The first rolling element 31 is caused to make contact with a portion of the outer circumference of the planetary roller 20 which is greater in the radius of rotation than in the case of FIG. 4b. As a result, the rotation rate of the second rolling element 32 is smaller than the rotation rate of the first rolling element 31, so that the second rolling element 32 rotates at a low speed.

In FIG. 4c, the support pin 21 is inclined with respect to the principal axis J in an opposite direction when compared to the case of FIG. 4a. The upper end of the support pin 21 is arranged radially inward of the lower end of the support pin 21. This causes the second rolling element 32 to make contact with a portion of the outer circumference of the planetary roller 20 which is greater in the radius of rotation than in the case of FIG. 4b. The first rolling element 31 is caused to make contact with a portion of the outer circumference of the planetary roller 20 which is smaller in the radius of rotation than in the case of FIG. 4b. As a result, the rotation rate of the second rolling element 32 is greater than the rotation rate of the first rolling element 31, so that the second rolling element 32 rotates at a high speed.

The first rolling element 31 and the second rolling element 32 are arranged one above the other in the axial direction with the planetary rollers 20 therebetween. Each of the first rolling element 31 and the second rolling element 32 is urged in the axial direction by the pressure control cam 31A. The urging force generated by the pressure control cam 31A is converted into normal forces 31F and 32F. The normal forces 31F and 32F cause the first rolling element 31 and the second rolling element 32, respectively, to be pressed against the rolling contact surface 23 of each planetary roller 20. Specifically, an axial component 31f of the normal force 31F of the rolling element 31, and an axial component 32*f* of the normal force 32F of the second rolling element 32 are both constant. The direction of the axial component 31*f* is opposite to the direction of the axial component 32*f*. The magnitude of the axial component 31*f* is substantially equal to the magnitude of the axial component 32*f*.

The normal forces 31F and 32F are forces that press the first rolling element 31 and the second rolling element 32, respectively, against the rolling contact surface 23, and act in directions of normals to the rolling contact surface 23 at points of contact with the first rolling element 31 and the second rolling element 32, respectively. Therefore, the direction of each of the normal forces 31F and 32F varies with the inclination of the support pin 21. The magnitude of each of the normal forces 31F and 32F also varies with the inclination of the support pin 21. That is, the rotary torque transferred between the planetary roller 20 and each of the first rolling element 31 and the second rolling element 32 varies with the inclination of the support pin 21 with respect to the principal axis J.

More specifically, the normal force 31F increases as the inclination angle of the generatrix of the first conical surface 231 with respect to the principal axis J decreases. Similarly, the normal force 32F increases as the inclination angle of the generatrix of the second conical surface 232 with respect to the principal axis J decreases. That is, as the rotation rates of the first rolling element 31 and the second rolling element 32 decrease in accordance with the speed change ratio, the rotary torques transferred between the planetary roller 20 and the first rolling element 31 and the second rolling element 32, respectively, increase. Accordingly, regardless of the speed change ratio, an optimum ratio of the normal forces 31F and 32F and an optimum ratio of the rotary torques can always be obtained. This results in improved transmission performance and efficiency of the continuously variable transmission 100.

Meanwhile, the third rolling element 33 is arranged on the opposite side of the planetary roller 20 in the radial direction with respect to each of the first rolling element 31 and the second rolling element 32. Accordingly, the third rolling element 33 receives the resultant of the normal force 31F and the normal force 32F through the planetary roller 20, and a normal force 33F of the third rolling element 33 is a reaction force for the resultant.

In FIG. 4*b*, the support pin 21 is arranged in parallel with the principal axis J. Therefore, a direction in which the generatrix of the first conical surface 231 is inclined is different from a direction in which the generatrix of the second conical surface 232 is inclined. However, the inclination angle of the generatrix of the first conical surface 231 with respect to the principal axis J is substantially equal to the inclination angle of the generatrix of the second conical surface 232 with respect to the principal axis J. Accordingly, the normal forces 31F and 32F are substantially equal to each other in magnitude. Therefore, when the rotation rate of the first rolling element 31 is substantially equal to the rotation rate of the second rolling element 32, the torque transferred between the first rolling element and the planetary roller 20 is substantially equal to the torque transferred between the second rolling element and the planetary roller 20.

In FIG. 4*a*, the inclination angle of the generatrix of the first conical surface 231 with respect to the principal axis J is greater than the inclination angle of the generatrix of the second conical surface 232 with respect to the principal axis J. Accordingly, the normal force 31F is smaller than in the case of FIG. 4*b*, while the normal force 32F is greater than in the case of FIG. 4*b*. That is, to compare the case of FIG. 4*a* against the case of FIG. 4*b*, the first rolling element 31, having a relatively high rotation rate, decreases in the torque transferred to the planetary roller 20, while the second rolling element 32, having a relatively low rotation rate, increases in the torque transferred from the planetary roller 20.

In FIG. 4*c*, the inclination angle of the generatrix of the first conical surface 231 with respect to the principal axis J is smaller than the inclination angle of the generatrix of the second conical surface 232 with respect to the principal axis J.

Accordingly, the normal force 31F is greater than in the case of FIG. 4*b*, while the normal force 32F is smaller than in the case of FIG. 4*b*. That is, to compare the case of FIG. 4*c* against the case of FIG. 4*b*, the first rolling element 31, having a relatively low rotation rate, increases in the torque transferred to the planetary roller 20, while the second rolling element 32, having a relatively high rotation rate, decreases in the torque transferred from the planetary roller 20.

It is desirable that each of the inclination angle of the generatrix of the first conical surface 231 with respect to the support pin 21 and the inclination angle of the generatrix of the second conical surface 232 with respect to the support pin 21 be about 45 degrees. In this case, the continuously variable transmission 100 is able to achieve improved efficiency.

Figure 5:
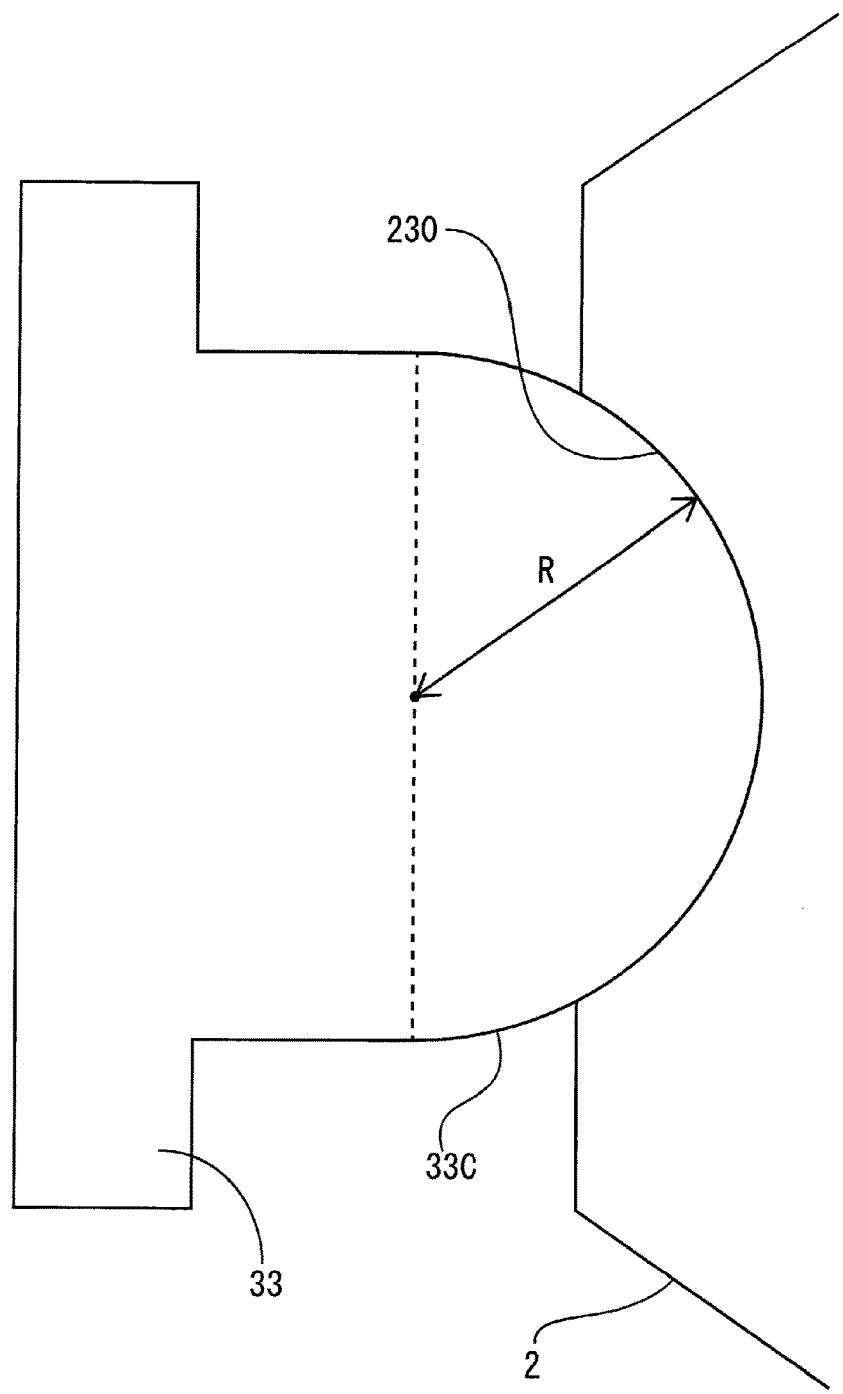
FIG. 5 is a diagram illustrating examples of the shapes of a recessed portion of a planetary roller and a contact portion of a third rolling element.

FIG. 5 is a diagram illustrating examples of the shapes of the recessed portion 230 of the planetary roller 20 and the contact portion 33C of the third rolling element 33, illustrating sections thereof taken along a plane including the principal axis J.

The contact portion 33C is substantially in the shape of an arc in a section. That is, the inner surface of the recessed portion 230 makes contact with the contact portion 33C. Each of the shape of a section of the recessed portion 230 and the shape of a section of the contact portion 33C taken along a plane including the principal axis J includes an arc. This contributes to preventing each of the contact portion 33C and the recessed portion 230 from being damaged or worn.

The radius R of curvature of the contact portion 33C is substantially equal to the radius R of curvature of the recessed portion 230. The length of the arc of the contact portion 33C is greater than the length of the arc of the recessed portion 230. That is, when the contact portion 33C is in contact with the inner surface of the recessed portion 230, the arc which is a portion of the section of the recessed portion 230 coincides with a portion of the arc which is the section of the contact portion 33C. This allows the third rolling element 33 to be smoothly moved in the axial direction within a certain range while keeping the contact portion 33C in contact with the inner surface of the recessed portion 230.

Figure 6:
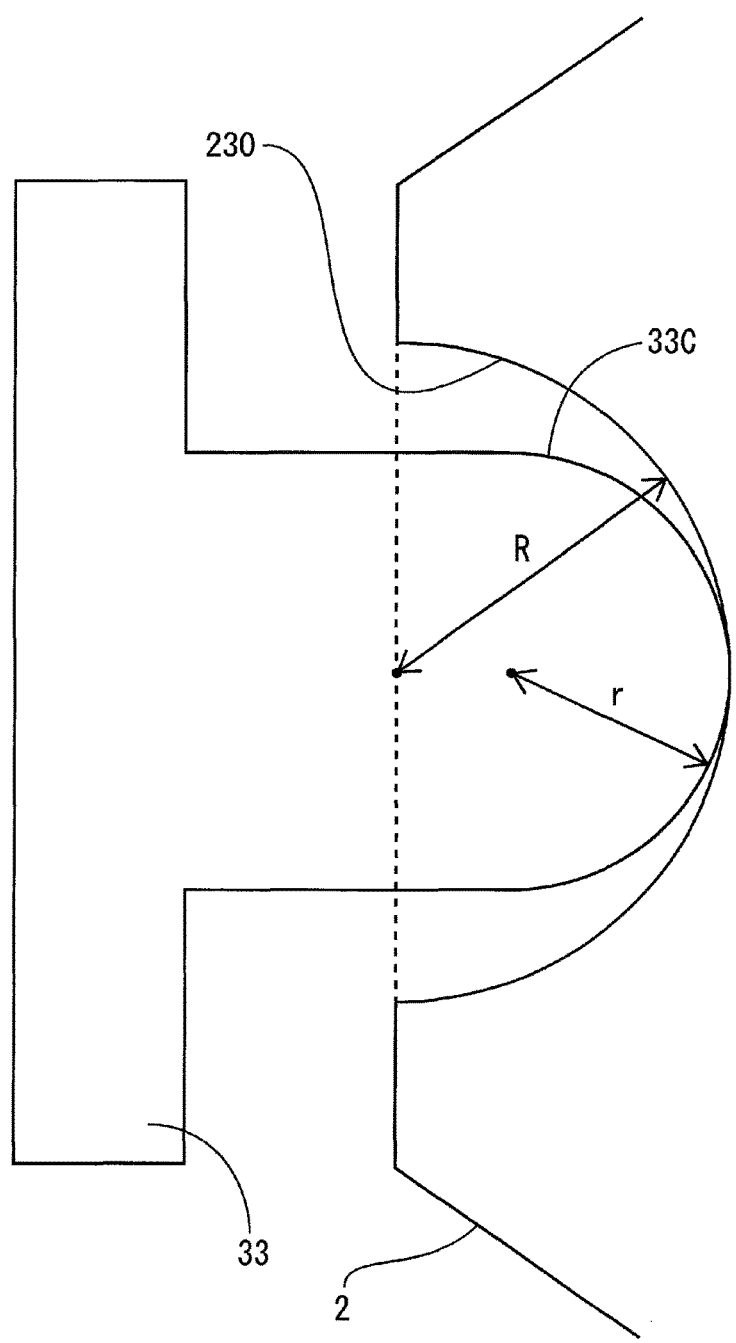
FIG. 6 is a diagram illustrating other examples of the shapes of a recessed portion of a planetary roller and a contact portion of a third rolling element.

FIG. 6 is a diagram illustrating other examples of the shapes of the recessed portion 230 of the planetary roller 20 and the contact portion 33C of the third rolling element 33, illustrating sections thereof taken along a plane including the principal axis J.

The contact portion 33C of the third rolling element 33 is in the shape of an arc in a section. That is, the inner surface of the recessed portion 230 makes contact with the contact portion 33C. Each of the section of the recessed portion 230 and the section of the contact portion 33C taken along the plane including the principal axis J is in the shape of an arc.

This contributes to preventing each of the contact portion 33C and the recessed portion 230 from being damaged or worn.

The radius r of curvature of the contact portion 33C is smaller than the radius R of curvature of the recessed portion 230. That is, when a tip of the contact portion 33C is in contact with the deepest portion of the inner surface of the recessed portion 230, a vertical gap is defined between the contact portion 33C and the recessed portion 230. This allows the third rolling element 33 to be smoothly moved in the axial direction within a certain range while keeping the contact portion 33C in contact with the inner surface of the recessed portion 230. In addition, when compared to the case of FIG. 5, the range over which the third rolling element 33 is capable of moving is increased, increasing the range over which the inclination angle of the support pin 21 with respect to the principal axis J can vary. This increases the range over which the speed change ratio of the continuously variable transmission can vary.

Each planetary roller 20 includes the recessed portion 230 in the shape of a circular ring. The third rolling element is arranged to make contact with the inner surface of the recessed portion 230. Accordingly, the speed change ratio can be varied by moving the third rolling element 33 in the axial direction and thus inclining the support pin 21. Accordingly, the continuously variable transmission can be constructed without the need for a complicated transmission mechanism as provided in related art. Thus, a reduction in the number of parts of the continuously variable transmission can be achieved. This contributes to reducing the size or weight of the continuously variable transmission. This in turn contributes to reducing the production cost of the continuously variable transmission, and lowering the price of the continuously variable transmission.

The rolling contact surface 23 includes the first conical surface 231 and the second conical surface 232. The first rolling element 31 is arranged to make contact with the first conical surface 231. The second rolling element 32 is arranged to make contact with the second conical surface 232. Accordingly, as the rotation rate of the first rolling element and the rotation rate of the second rolling element 32 decrease in accordance with the speed change ratio, the rotary torques transferred between the planetary roller 20 and the first rolling element 31 and the second rolling element 32, respectively, increase. Accordingly, the continuously variable transmission is able to achieve improved efficiency.

The shape of the contact portion 31C accords with the envelope of the generatrix of the first conical surface 231 when the inclination of the support pin 21 is varied. The shape of the contact portion 32C accords with the envelope of the generatrix of the second conical surface 232 when the inclination of the support pin 21 is varied. This enables each of the first rolling element 31 and the second rolling element 32 to be kept in contact with the rolling contact surface 23 regardless of a change in the inclination of the support pin 21. This makes it possible to adopt the planetary roller 20 the rolling contact surface 23 of which includes the first conical surface 231 and the second conical surface 232.

The continuously variable transmission 100 is able to operate with the first rolling element 31, which makes contact with each planetary roller 20 from radially outside, as the input side, and the second rolling element 32, which makes contact with each planetary roller 20 from radially outside, as the output side. Note that the input side and the output side may be reversed in the continuously variable transmission 100.

Note that the structure of the planetary roller 20 is not limited to the above-described structure. For example, the planetary roller 20 may alternatively be spherical and include an annular recessed portion 230. In this case, the first rolling element 31 is arranged to make contact with a spherical surface above the recessed portion 230. The second rolling element 32 is arranged to make contact with a spherical surface below the recessed portion 230.

In a second preferred embodiment, a planetary roller 20 includes a projecting portion 233 in the shape of a circular ring.

Figure 7:
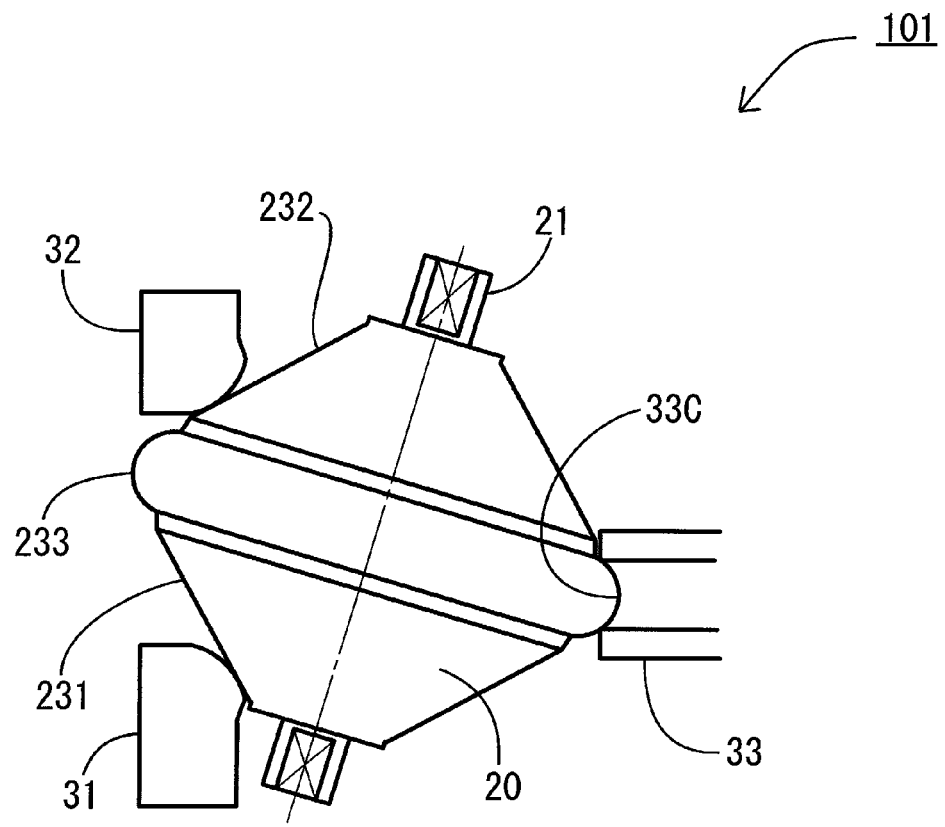
FIG. 7 is a diagram illustrating an exemplary structure of an important portion of a continuously variable transmission according to a second preferred embodiment of the present invention.

FIG. 7 is a diagram illustrating an exemplary structure of an important portion of a continuously variable transmission 101 according to the second preferred embodiment of the present invention, illustrating only the planetary roller 20 and components arranged in the vicinity thereof. The continuously variable transmission 101 is different from the continuously variable transmission 100 in the shape of the planetary roller 20 and the shape of a third rolling element 33. Note that the continuously variable transmission 101 is otherwise similar in structure to the continuously variable transmission 100. Accordingly, redundant description will be omitted below.

A rolling contact surface 23 includes the projecting portion 233 in the shape of a circular ring, a first conical surface 231, and a second conical surface 232. The first conical surface 231 is arranged axially below the projecting portion 233. The second conical surface 232 is arranged axially above the projecting portion 233. The projecting portion 233 includes a rolling contact surface with which the third rolling element 33 makes contact. The projecting portion 233 is, in a section, a projecting portion of an outer circumferential surface of the planetary roller 20. The shape of the section thereof is, for example, in the shape of an arc. The projecting portion 233 is arranged in a substantial middle with respect to a longitudinal direction of a support pin 21, and is in the shape of a circular ring with the support pin 21 in a center.

The third rolling element 33 is arranged to make contact with the planetary roller 20 from radially inside with respect to a principal axis J. The third rolling element 33 includes a contact portion 33C with which the projecting portion 233 makes contact. The contact portion 33C has a section in the shape of an arc and recessed radially inward. That is, the projecting portion 233 is arranged to make contact with an inner surface of the contact portion 33C.

As with the first preferred embodiment, the speed change ratio of the continuously variable transmission 101 can be varied by an axial movement of the third rolling element 33 and a resulting change in the inclination of the support pin 21.

Figure 8:
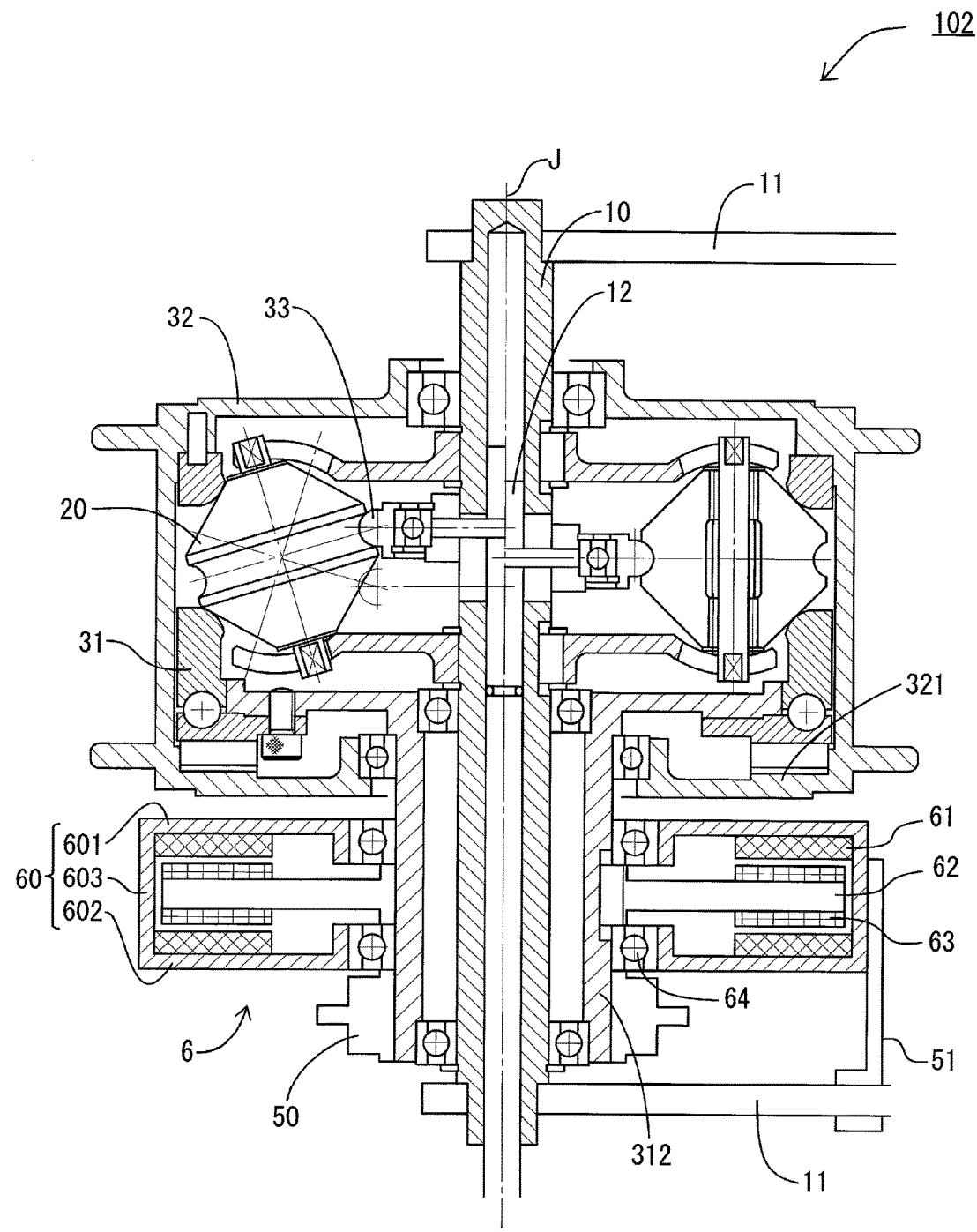
FIG. 8 is a diagram illustrating an exemplary structure of a continuously variable transmission according to a third preferred embodiment of the present invention.

FIG. 8 is a diagram illustrating an exemplary structure of a continuously variable transmission 102 according to a third preferred embodiment of the present invention. The continuously variable transmission 102 is different from the continuously variable transmission 100 in including a motor 6. Note that the continuously variable transmission 102 is otherwise similar in structure to the continuously variable transmission 100. Accordingly, redundant description will be omitted below.

The motor 6 is arranged between a second rolling element lower support portion 321 and a sprocket 50. The motor 6 is driven to rotate a first rolling element cylindrical portion 312. The motor 6 includes a motor stationary portion and a motor rotating portion. The motor stationary portion is supported by a dropout 11 through a motor support portion 51. That is, the motor stationary portion is fixed to a shaft 10. The motor rotating portion is supported to be rotatable about a principal axis J.

The motor rotating portion includes a rotor 62 and a plurality of magnets 63. The rotor 62 is in the shape of a disk, extending radially, and is fixed to the first rolling element cylindrical portion 312. The rotor 62 is preferably a laminated body defined by a plurality of electromagnetic steel sheets placed one upon another. In this preferred embodiment, each magnet 63 is in the shape of a circular ring. The magnets 63 are attached to an upper surface and a lower surface of the rotor 62, respectively. Note that each magnet 63 may be defined by a plurality of pole pieces.

The motor stationary portion includes a housing 60 and a plurality of stators 61. The housing 60 includes a motor cover portion 601, a motor bottom portion 602, and a motor cylindrical portion 603. Each of the motor cover portion 601 and the motor bottom portion 602 is in the shape of a disk, extending radially, and is supported by the first rolling element cylindrical portion 312 through a bearing 64. The motor cover portion 601 is arranged axially above the rotor 62. The motor bottom portion 602 is arranged axially below the rotor 62. The motor cylindrical portion 603 has a cylindrical shape, and is arranged to join a radially outer end of the motor cover portion 601 and a radially outer end of the motor bottom portion 602 to each other. The stators 61 are attached to a lower surface of the motor cover portion 601 and an upper surface of the motor bottom portion 602, respectively. Each stator 61 is arranged axially opposite to the magnet 63.

In the motor 6, electric drive currents are supplied to the stators 61 to generate a torque acting in the circumferential direction between the stators 61 and the magnets 63. As a result, the first rolling element cylindrical portion 312 is caused to rotate relative to the shaft 10.

With the generation of the above torque, the motor 6 is able to provide assistance to a driving torque applied to the sprocket. Thus, the continuously variable transmission is able to achieve a reduction in the number of parts without adopting a complicated transmission mechanism.

Figure 9:
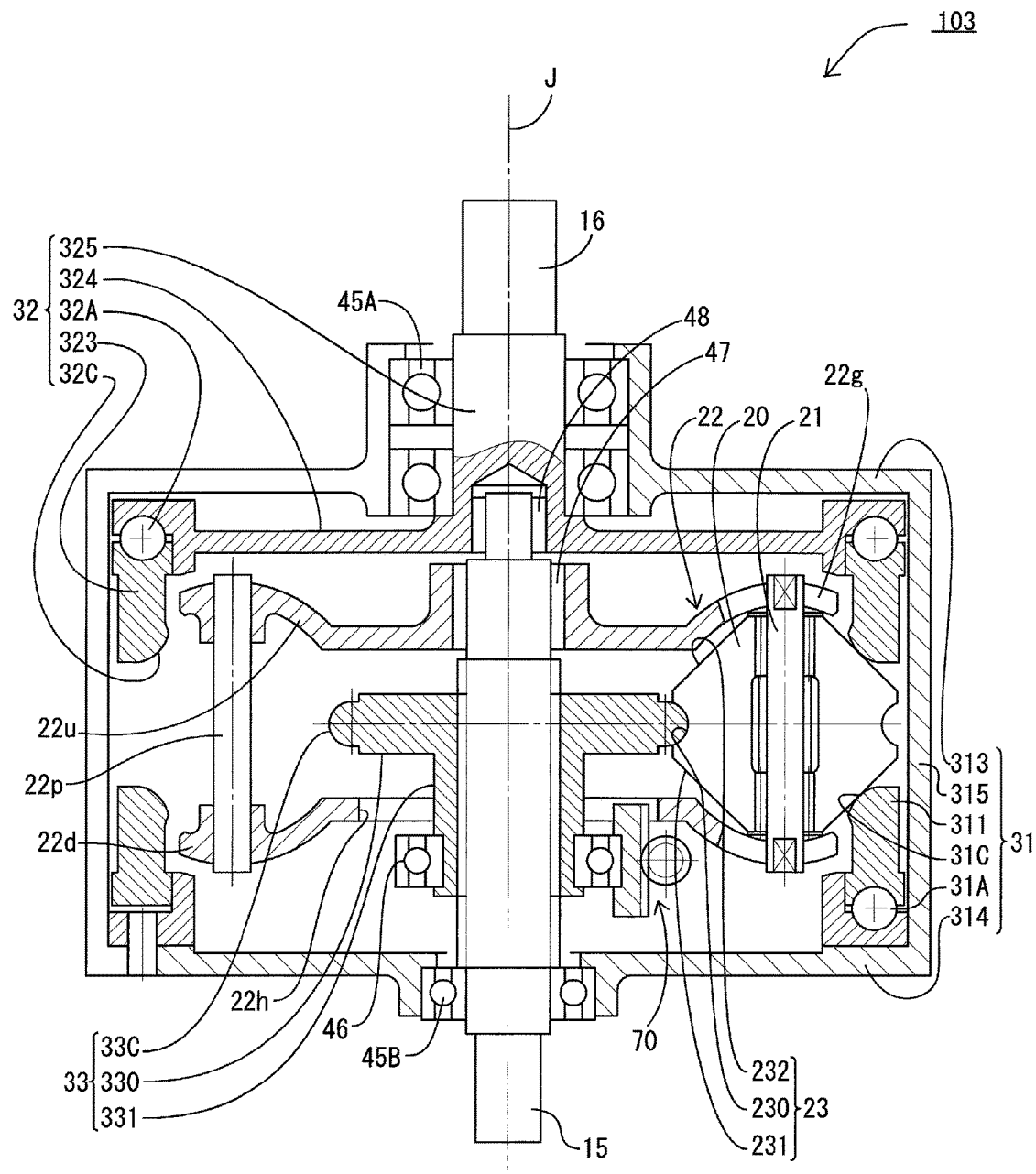
FIG. 9 is a diagram illustrating an exemplary structure of a continuously variable transmission according to a fourth preferred embodiment of the present invention.

FIG. 9 is a diagram illustrating an exemplary structure of a continuously variable transmission 103 according to a fourth preferred embodiment of the present invention, illustrating a section thereof taken along a plane including a principal axis J.

The continuously variable transmission 103 includes a first shaft 15, a second shaft 16, a planetary roller 20, a first rolling element 31, a second rolling element 32, a third rolling element 33, and a gear mechanism 70. In the following description, members or portions of the continuously variable transmission 103 that have their equivalents in the continuously variable transmission 100 will be designated by the same reference numerals as those of their equivalents in the continuously variable transmission 100, and redundant description will be omitted.

The first shaft 15 and the second shaft 16 are each a substantially columnar member arranged to extend in the axial direction (i.e., the vertical direction), and are arranged to be coaxial with each other with the principal axis J as a center. The first shaft 15 is arranged below the second shaft 16. The first shaft 15 and the second shaft 16 are coupled through the second rolling element 32 to be capable of relative rotation.

The structures of the planetary roller 20 and a support pin 21 are identical to the structures of the planetary roller 20 and the support pin 21, respectively, according to the above-described preferred embodiment. A planetary roller support portion 22 is supported to be rotatable relative to the first shaft 15 and the second shaft 16. The planetary roller support portion 22 includes an upper support portion 22u, a lower support portion 22d, and a securing pin 22p. The upper support portion 22u is annular, and is supported by the shaft 15 through a bearing 47. The lower support portion 22d is annular and coaxial with the upper support portion 22u, is arranged axially below the upper support portion 22u, and includes a through hole 22h through which the shaft 15 is arranged to extend. The securing pin 22p is arranged to extend in the axial direction, and is arranged at a circumferential position different from that of the planetary roller 20. An upper end of the securing pin 22p is coupled to the upper support portion 22u. A lower end of the securing pin 22p is coupled to the lower support portion 22d. That is, the lower support portion 22d is secured to the upper support portion 22u through the securing pin 22p. Each of the upper support portion 22u and the lower support portion 22d includes a guide portion 22g at a circumferential position corresponding to that of the planetary roller 20.

The first rolling element 31 is a housing of the continuously variable transmission 103, and is arranged to house the planetary roller 20, the second rolling element 32, the third rolling element 33, and the gear mechanism 70. The first rolling element 31 is arranged to support the first shaft 15 and the second shaft 16 to be capable of relative rotation, and make contact with the planetary roller 20 from radially outside with respect to the principal axis J.

The first rolling element 31 is arranged to have an annular shape centered on the principal axis J. More specifically, the first rolling element 31 includes a first rolling element annular portion 311, a first rolling element upper support portion 313, a first rolling element lower support portion 314, and a first rolling element cylindrical portion 315.

The first rolling element upper support portion 313 is substantially in the shape of a disk, extending radially, and is arranged axially above the planetary roller 20. The first rolling element upper support portion 313 is arranged to support a second rolling element cylindrical portion 325 through a bearing 45A.

The first rolling element lower support portion 314 is substantially in the shape of a disk, extending radially, and is arranged axially below the planetary roller 20. The first rolling element lower support portion 314 is arranged to support the first shaft 15 through a bearing 45B.

The first rolling element cylindrical portion 315 is arranged to have a cylindrical shape, and is arranged to join a radially outer end of the first rolling element upper support portion 313 and a radially outer end of the first rolling element lower support portion 314 to each other.

The first rolling element annular portion 311 is arranged to have an annular shape, and is arranged to extend axially upward along an inner circumferential surface of the first rolling element cylindrical portion 315. A lower end of the first rolling element annular portion 311 is supported by the first rolling element lower support portion 314 through a pressure control cam 31A. The first rolling element annular portion 311 includes a contact portion 31C arranged to make contact with the planetary roller 20 in an inner circumferential surface thereof in the vicinity of an upper end of the first rolling element annular portion 311. The contact portion 31C is arranged to make contact with a first conical surface 231 from radially outside with respect to the principal axis J. The pressure control cam 31A is arranged to generate an axial urging force using a rotary torque about the principal axis J. The first rolling element annular portion 311 is thus pressed against a rolling contact surface 23. An appropriate contact pressure is generated between the first rolling element annular portion 311 and the rolling contact surface 23.

The second rolling element 32 is fixed to the second shaft 16, and is arranged to make contact with the planetary roller 20 from radially outside with respect to the principal axis J. The second rolling element 32 is arranged to have an annular shape centered on the principal axis J. More specifically, the second rolling element 32 includes a second rolling element support portion 324, a second rolling element annular portion 323, and the second rolling element cylindrical portion 325.

The second rolling element support portion 324 is substantially in the shape of a disk, extending radially.

The second rolling element annular portion 323 is arranged to have an annular shape, and is arranged to extend axially downward from a radially outer end of the second rolling element support portion 324. An upper end of the second rolling element annular portion 323 is supported by the second rolling element support portion 324 through a pressure control cam 32A. The second rolling element annular portion 323 includes a contact portion 32C arranged to make contact with the planetary roller 20 in an inner circumferential surface thereof in the vicinity of a lower end of the second rolling element annular portion 323. The contact portion 32C is arranged to make contact with a second conical surface 232 from radially outside with respect to the principal axis J. The pressure control cam 32A is arranged to generate an axial urging force using a rotary torque about the principal axis J. The second rolling element annular portion 323 is thus pressed against the rolling contact surface 23. An appropriate contact pressure is generated between the second rolling element annular portion 323 and the rolling contact surface 23.

The second rolling element cylindrical portion 325 is arranged to have a cylindrical shape, and is arranged to extend axially upward from a radially inner end of the second rolling element support portion 324. The second shaft 16 is press fitted in an axially upper portion of the second rolling element cylindrical portion 325. The first shaft 15 is fitted in an axially lower portion of the second rolling element cylindrical portion 325. The first shaft 15 is supported by the second rolling element support portion 324 through a bearing 48. That is, the second rolling element cylindrical portion 325 is fixed to the second shaft 16, and is supported to be rotatable relative to the first shaft 15.

The third rolling element 33 is supported to be capable of moving in the axial direction relative to the first shaft 15, and is arranged to make contact with the planetary roller 20 from radially inside with respect to the principal axis J. The third rolling element 33 is arranged to have an annular shape centered on the principal axis J. More specifically, the third rolling element 33 includes a third rolling element support portion 330 and a third rolling element cylindrical portion 331.

The third rolling element support portion 330 is substantially in the shape of a disk, extending radially. The third rolling element support portion 330 includes a contact portion 33C arranged to make contact with the planetary roller in an outer circumferential surface of the third rolling element support portion 330. The contact portion 33C is arranged to make contact with an inner surface of a recessed portion 230 from radially inside with respect to the principal axis J. The contact portion 33C is arranged to have an arc shape being convex radially outwardly in a section including the principal axis J.

The third rolling element cylindrical portion 331 is arranged to have a cylindrical shape, and is arranged to extend axially downward from a radially inner end of the third rolling element support portion 330. The first shaft 15 is arranged inside of the third rolling element cylindrical portion 331. The third rolling element cylindrical portion 331 is, for example, spline-fitted to the first shaft 15. Thus, the third rolling element 33 is incapable of rotating but capable of moving in the axial direction relative to the first shaft 15.

The gear mechanism 70 is supported by the third rolling element cylindrical portion 331 through a bearing 46. The gear mechanism 70 is driven by an external driving source (not shown) to move the third rolling element 33 in the axial direction. A rack and pinion, for example, is used as the gear mechanism 70. In this case, the third rolling element 33 can be caused to move in the axial direction using a rotating operation of the driving source.

In the continuously variable transmission 103, the first rolling element 31 is fixed, and the first shaft 15 and the second shaft 16 are used as an input side and an output side, respectively. The second rolling element 32 is arranged to make contact with the planetary roller 20 from radially outside. The third rolling element 33 is arranged to make contact with the planetary roller 20 from radially inside. The third rolling element 33 is arranged to rotate together with the first shaft 15. A rotary torque of the third rolling element 33 is transferred to the second rolling element 32 through the planetary roller 20. As a result, the second shaft 16 is caused to rotate together with the second rolling element 32.

As with the continuously variable transmission 100, the ratio of the relative rotation rates of the first rolling element 31 and the second rolling element 32 varies with the inclination angle of the support pin 21 with respect to the shaft 15. Accordingly, the speed change ratio of the continuously variable transmission 103 can be varied by a change in the inclination of the support pin 21.

Thus, the continuously variable transmission 103 is capable of normal and reverse rotation, including rotation with a zero included in the speed change ratio, and is able to achieve a reduction in the number of parts without adopting a complicated transmission mechanism.

In a continuously variable transmission 104 according to a fifth preferred embodiment, each of a first rolling element 31 and a second rolling element 32 is arranged to make contact with each of planetary rollers 20 from radially inside. A third rolling element 33 is arranged to make contact with each planetary roller 20 from radially outside.

Figure 10:
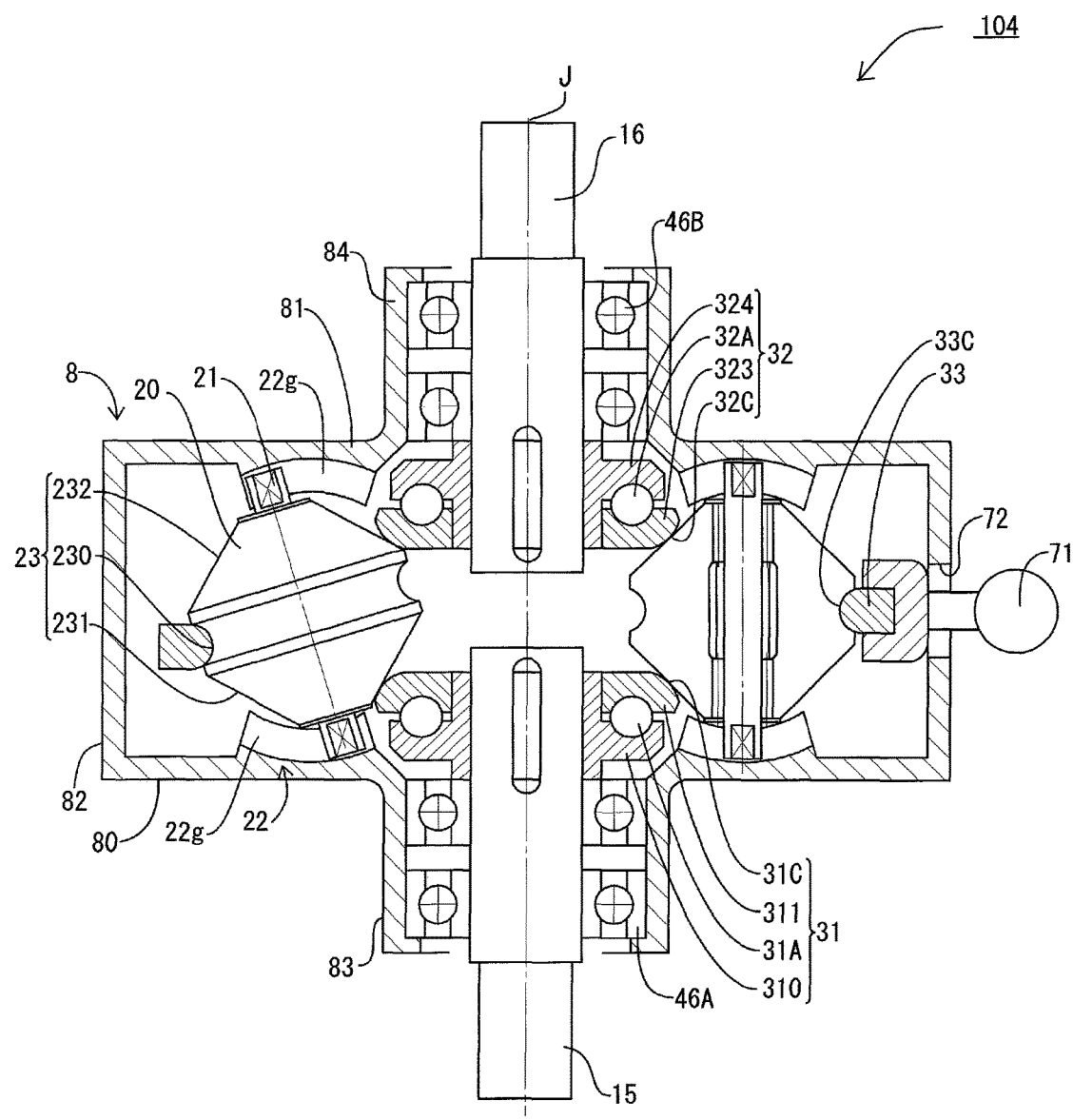
FIG. 10 is a diagram illustrating an exemplary structure of a continuously variable transmission according to a fifth preferred embodiment of the present invention.

FIG. 10 is a diagram illustrating an exemplary structure of the continuously variable transmission 104 according to the fifth preferred embodiment of the present invention, illustrating a section thereof taken along a plane including a principal axis J.

The continuously variable transmission 104 includes a first shaft 15, a second shaft 16, the planetary rollers 20, the first rolling element 31, the second rolling element 32, the third rolling element 33, an adjusting lever 71, and a housing 8. Note that, in the following description, members or portions of the continuously variable transmission 104 that have their equivalents in the continuously variable transmission 100 will be designated by the same reference numerals as those of their equivalents in the continuously variable transmission 100, and redundant description will be omitted.

The first shaft 15 and the second shaft 16 are each a substantially columnar member arranged to extend in the axial direction (i.e., the vertical direction), and are arranged to be coaxial with each other with the principal axis J as a center. The first shaft 15 is arranged below the second shaft 16. The first shaft 15 is supported by the housing 8 through a bearing 46A. The second shaft 16 is supported by the housing 8 through a bearing 46B.

A planetary roller support portion 22 is fixed to the housing 8. A pair of guide portions 22g are included in the planetary roller support portion 22. The pair of guide portions 22g are, for example, arranged to have concentric arc shapes. Both ends of a support pin 21 are supported to be capable of moving along the guide portions 22g. The guide portions 22g are fixed to an upper surface of a housing lower support portion 80 and a lower surface of a housing upper support portion 81, respectively.

The first rolling element 31 is engaged with the first shaft 15, and is arranged to make contact with each planetary roller 20 from radially inside with respect to the principal axis J. The first rolling element 31 is arranged to have an annular shape centered on the principal axis J. More specifically, the first rolling element 31 includes a first rolling element support portion 310 and a first rolling element annular portion 311.

The first rolling element support portion 310 is substantially in the shape of a disk, extending radially, and is fixed to the first shaft 15.

The first rolling element annular portion 311 is arranged to have an annular shape, and is arranged axially above the first rolling element support portion 310. A lower end of the first rolling element annular portion 311 is supported by the first rolling element support portion 310 through a pressure control cam 31A. The first rolling element annular portion 311 includes a contact portion 31C arranged to make contact with each planetary roller 20 in an outer circumferential surface thereof in the vicinity of an upper end of the first rolling element annular portion 311. The contact portion 31C is arranged to make contact with a first conical surface 231 from radially inside with respect to the principal axis J. The pressure control cam 31A is arranged to generate an axial urging force using a rotary torque about the principal axis J, the axial urging force being proportional to the rotary torque. The first rolling element annular portion 311 is thus pressed against a rolling contact surface 23, and an appropriate contact pressure is generated between the first rolling element annular portion 311 and the rolling contact surface 23.

The second rolling element 32 is engaged with the second shaft 16, and is arranged to make contact with each planetary roller 20 from radially inside with respect to the principal axis J. The second rolling element 32 is arranged to have an annular shape centered on the principal axis J. More specifically, the second rolling element 32 includes a second rolling element support portion 324 and a second rolling element annular portion 323.

The second rolling element support portion 324 is substantially in the shape of a disk, extending radially, and is fixed to the second shaft 16. The second rolling element annular portion 323 is arranged to have an annular shape, and is arranged axially below the second rolling element support portion 324. An upper end of the second rolling element annular portion 323 is supported by the second rolling element support portion 324 through a pressure control cam 32A. The second rolling element annular portion 323 includes a contact portion 32C arranged to make contact with each planetary roller 20 in an outer circumferential surface thereof in the vicinity of a lower end of the second rolling element annular portion 323. The contact portion 32C is arranged to make contact with a second conical surface 232 from radially inside with respect to the principal axis J. The pressure control cam 32A is arranged to generate an axial urging force using a rotary torque about the principal axis J, the axial urging force being proportional to the rotary torque. The second rolling element annular portion 323 is thus pressed against the rolling contact surface 23. An appropriate contact pressure is generated between the second rolling element annular portion 323 and the rolling contact surface 23.

The third rolling element 33 is supported to be capable of moving in the axial direction relative to the housing 8. The third rolling element 33 is arranged to make contact with each planetary roller 20 from radially outside with respect to the principal axis J. The third rolling element 33 is arranged to have an annular shape centered on the principal axis J.

An inner circumferential surface of the third rolling element 33 includes a contact portion 33C arranged to make contact with each planetary roller 20. The contact portion 33C is arranged to make contact with an inner surface of a recessed portion 230 from radially outside with respect to the principal axis J. The contact portion 33C is arranged to have an arc shape being convex radially inwardly in a section including the principal axis J.

The adjusting lever 71 includes a portion extending in a radial direction, and is arranged to hold upper and lower end surfaces of the third rolling element 33. Thus, the third rolling element 33 is supported to be rotatable relative to the adjusting lever 71, and an axial movement thereof is regulated by the adjusting lever 71. The adjusting lever 71 is arranged to pass through a through hole 72 of a housing cylindrical portion 82. A radially outer end of the adjusting lever 71 is arranged outside of the housing 8. The adjusting lever 71 may be an operation unit operated by a human operator, or may be actuated by a driving source to move in the axial direction.

The housing 8 is arranged to house the planetary rollers 20, the first rolling element 31, the second rolling element 32, and the third rolling element 33. The housing 8 includes the housing lower support portion 80, the housing upper support portion 81, the housing cylindrical portion 82, a housing lower cylindrical portion 83, and a housing upper cylindrical portion 84.

Each of the housing lower support portion 80 and the housing upper support portion 81 is substantially in the shape of a disk, extending radially. The housing lower support portion is arranged axially below the planetary rollers 20. The housing upper support portion 81 is arranged axially above the planetary rollers 20. The housing cylindrical portion 82 is arranged to have a cylindrical shape, and is arranged to house the planetary rollers 20 and the third rolling element 33 therein. The housing cylindrical portion 82 is arranged to join a radially outer end of the housing lower support portion 80 and a radially outer end of the housing upper support portion 81 to each other. The housing cylindrical portion 82 includes the through hole 72. At least a portion of the adjusting lever 71 is arranged to pass through the through hole 72. The housing lower cylindrical portion 83 is arranged to have a cylindrical shape, and is arranged to extend axially downward from a radially inner end of the housing lower support portion 80. The housing upper cylindrical portion 84 is arranged to have a cylindrical shape, and is arranged to extend axially upward from a radially inner end of the housing upper support portion 81.

In the continuously variable transmission 104, the housing 8 is fixed, and the first shaft 15 and the second shaft 16 are used as an input side and an output side, respectively. Each of the first rolling element 31 and the second rolling element 32 is arranged to make contact with each planetary roller 20 from radially inside. The third rolling element 33 is arranged to make contact with each planetary roller 20 from radially outside. The first rolling element 31 is arranged to rotate together with the first shaft 15. A rotary torque of the first rolling element 31 is transferred to the second rolling element 32 through the planetary rollers 20. As a result, the second shaft 16 is caused to rotate together with the second rolling element 32.

As with the structure of the continuously variable transmission 100, the ratio of the relative rotation rates of the first rolling element 31 and the second rolling element 32 varies with the inclination angle of the support pin 21 with respect to the axis J. Accordingly, the speed change ratio of the continuously variable transmission 104 can be varied by an axial movement of the adjusting lever 71 and a resulting change in the inclination of the support pin 21.

Thus, the continuously variable transmission is able to achieve an increase in the range of the speed change ratio, an increase in efficiency, and a significant reduction in the number of parts, without adopting a complicated transmission mechanism.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A friction-type continuously variable transmission comprising:
   a first rolling element being annular and centered on a principal axis extending in a vertical direction;
   a second rolling element being annular and centered on the principal axis;
   a third rolling element being annular and centered on the principal axis;
   a plurality of planetary rollers arranged in a circumferential direction about the principal axis;
   a plurality of support pins each of which is arranged to rotatably support a separate one of the planetary rollers; and
   a planetary roller support portion arranged to support each support pin such that the support pin is capable of inclining in a section including the principal axis; wherein
   each planetary roller includes a recessed portion or projecting portion in a shape of a circular ring in an outer circumference thereof centered on the support pin;
   the first rolling element is arranged to make contact with a rolling contact surface of the planetary roller from one side in a radial direction axially below the recessed portion or the projecting portion, and is supported through a bearing to be rotatable relative to the third rolling element;
   the second rolling element is arranged to make contact with the rolling contact surface of the planetary roller from the one side in the radial direction axially above the recessed portion or the projecting portion, and is supported through a bearing to be rotatable relative to the third rolling element; and
   the third rolling element is arranged to make contact with the recessed portion or the projecting portion of the planetary roller from an opposite side in the radial direction, and is supported to be capable of moving in the vertical direction relative to the planetary roller support portion.

2. The friction-type continuously variable transmission according to claim 1, wherein
   each of the first rolling element and the second rolling element is arranged to make contact with the planetary roller from radially outside; and
   the third rolling element is arranged to make contact with the planetary roller from radially inside.

3. The friction-type continuously variable transmission according to claim 2, further comprising a shaft arranged to extend along the principal axis, wherein
   the planetary roller support portion is fixed to the shaft;
   each of the first rolling element and the second rolling element is supported to be rotatable relative to the shaft; and
   the third rolling element is supported to be capable of moving in the vertical direction relative to the shaft.

4. The friction-type continuously variable transmission according to claim 1, wherein
   each of the first rolling element and the second rolling element is arranged to make contact with the planetary roller from radially inside; and
   the third rolling element is arranged to make contact with the planetary roller from radially outside.

5. The friction-type continuously variable transmission according to claim 4, further comprising a first shaft and a second shaft arranged coaxially with each other along the principal axis, and arranged to be rotatable relative to each other, wherein
   the first rolling element is fixed to the first shaft;
   the second rolling element is fixed to the second shaft; and
   the planetary roller support portion is supported to be rotatable relative to both the first shaft and the second shaft.

6. The friction-type continuously variable transmission according to claim 1, wherein
   the third rolling element includes a contact portion arranged to make contact with an inner surface of the recessed portion of the planetary roller; and
   the inner surface of the recessed portion defines an arc in the section including the principal axis.

7. The friction-type continuously variable transmission according to claim 6, wherein
   the contact portion of the third rolling element is in a shape of an arc;
   the inner surface of the recessed portion is arranged to have a radius of curvature substantially equal to a radius of curvature of the contact portion of the third rolling element; and
   the arc of the inner surface of the recessed portion is arranged to have a length smaller than a length of the arc of the contact portion of the third rolling element.

8. The friction-type continuously variable transmission according to claim 6, wherein
   the contact portion of the third rolling element is in a shape of an arc; and
   a section of the recessed portion is arranged to have a radius of curvature greater than a radius of curvature of the contact portion of the third rolling element.

9. The friction-type continuously variable transmission according to claim 1, wherein
   the third rolling element includes a contact portion arranged to make contact with the projecting portion of the planetary roller; and
   the third rolling element includes a recess defining an arc in the section including the principal axis, the contact portion of the third rolling element being defined in an inner surface of the recess.

10. The friction-type continuously variable transmission according to claim 3, wherein
the first rolling element includes:
a first rolling element support portion arranged to extend radially;
a first rolling element annular portion supported by a radially outer end of the first rolling element support portion, and arranged axially above the first rolling element support portion; and
a first rolling element cylindrical portion arranged to extend axially downward from a radially inner end of the first rolling element support portion;
the first rolling element annular portion is arranged to make contact with the planetary roller; and
the first rolling element cylindrical portion is supported by the shaft through a bearing.

11. The friction-type continuously variable transmission according to claim 10, wherein
the second rolling element includes:
a second rolling element lower support portion arranged to extend radially, axially below the planetary roller;
a second rolling element upper support portion arranged to extend radially, axially above the planetary roller;
a second rolling element cylindrical portion arranged to join a radially outer end of the second rolling element lower support portion and a radially outer end of the second rolling element upper support portion to each other; and
a second rolling element annular portion fixed to an inner circumferential surface of the second rolling element cylindrical portion;
the second rolling element annular portion is arranged to make contact with the planetary roller;
the second rolling element upper support portion is supported by the shaft through a bearing; and
the second rolling element lower support portion is supported by the first rolling element cylindrical portion through a bearing.

12. The friction-type continuously variable transmission according to claim 3, further comprising an adjusting rod arranged inside of the shaft to be capable of moving in the vertical direction relative to the shaft, wherein the third rolling element is supported to be rotatable with respect to the adjusting rod.

13. The friction-type continuously variable transmission according to claim 3, further comprising a gear mechanism arranged to move the third rolling element in the vertical direction relative to the shaft.

14. The friction-type continuously variable transmission according to claim 1, wherein the rolling contact surface of the planetary roller includes a conical surface coaxial with the support pin.

15. The friction-type continuously variable transmission according to claim 14, wherein a generatrix of the conical surface of the rolling contact surface of the planetary roller is inclined at an angle of about 45 degrees with respect to the support pin.

16. The friction-type continuously variable transmission according to claim 1, wherein each of the first rolling element and the second rolling element includes a contact portion arranged to make contact with the planetary roller, the contact portion defining an envelope of a cone generatrix of the rolling contact surface of the planetary roller when an inclination angle of the support pin with respect to the principal axis is varied.

17. The friction-type continuously variable transmission according to claim 1 wherein one of the first rolling element and the second rolling element includes a pressure control cam.

18. The friction-type continuously variable transmission according to claim 3, further comprising a motor including a motor rotating portion and a motor stationary portion, wherein
the motor stationary portion is fixed to the shaft; and
the motor rotating portion is fixed to the first rolling element.

19. The friction-type continuously variable transmission according to claim 2, further comprising a first shaft and a second shaft arranged coaxially with each other along the principal axis, and arranged to be capable of relative rotation, wherein
the planetary roller support portion is supported to be rotatable relative to both the first shaft and the second shaft;
the first rolling element is supported to be rotatable relative to both the first shaft and the second shaft;
the second rolling element is fixed to the second shaft; and
the third rolling element is supported to be capable of moving in the vertical direction relative to the first shaft.

20. The friction-type continuously variable transmission according to claim 19, wherein
the first rolling element includes:
a first rolling element lower support portion arranged to extend radially, axially below the planetary roller;
a first rolling element upper support portion arranged to extend radially, axially above the planetary roller;
a first rolling element cylindrical portion arranged to join a radially outer end of the first rolling element lower support portion and a radially outer end of the second rolling element upper support portion to each other; and
a first rolling element annular portion fixed to an inner circumferential surface of the first rolling element cylindrical portion;
the first rolling element annular portion is arranged to make contact with the planetary roller;
the first rolling element lower support portion is arranged to support the first shaft through a bearing; and
the first rolling element upper support portion is arranged to support the second shaft through a bearing.

21. The friction-type continuously variable transmission according to claim 19, wherein
the second rolling element includes:
a second rolling element support portion arranged to extend radially;
a second rolling element annular portion supported by a radially outer end of the second rolling element support portion, and arranged axially below the second rolling element support portion; and
a second rolling element cylindrical portion arranged to extend axially upward from a radially inner end of the second rolling element support portion;
the second rolling element annular portion is arranged to make contact with the planetary roller; and
the second rolling element cylindrical portion is fitted to the second shaft.

* * * * *